United States Patent [19]

Menschhorn et al.

[11] 4,376,011
[45] Mar. 8, 1983

[54] PROCESS FOR REMOVING PIGMENTS FROM WASTE PAPER

[75] Inventors: Fridolin Menschhorn, Vienna; Ernst Schönleitner, St. Aegyd; Gerhard Teufel, Pernitz; Paul Wertheimer, Vienna, all of Austria

[73] Assignee: Hoechst Aktiengesellschaft, Fed. Rep. of Germany

[21] Appl. No.: 196,605

[22] Filed: Oct. 14, 1980

[30] Foreign Application Priority Data

Oct. 16, 1979 [DE] Fed. Rep. of Germany ....... 2941783

[51] Int. Cl.$^3$ .............................................. D21C 5/02
[52] U.S. Cl. ......................................... 162/5; 209/166
[58] Field of Search ............... 162/5; 252/61; 209/166

[56] References Cited

U.S. PATENT DOCUMENTS

| 2,005,742 | 6/1935 | Hines | 162/5 |
| 2,312,466 | 3/1943 | Erickson et al. | 209/166 |
| 3,056,713 | 10/1962 | Gartner | 162/5 |
| 3,248,277 | 4/1966 | Gartner | 162/5 |
| 4,013,505 | 3/1977 | Balcar et al. | 209/166 |
| 4,040,949 | 8/1977 | Saitoh | 209/166 |

Primary Examiner—William F. Smith
Attorney, Agent, or Firm—Connolly and Hutz

[57] ABSTRACT

A flotation composition for removing pigments from waste paper, which consists of a carboxylic acid ester and of from 0 to 10 weight %, referred to the ester of the above formulae, of a surfactant.

5 Claims, No Drawings

PROCESS FOR REMOVING PIGMENTS FROM WASTE PAPER

The reprocessing of waste paper frequently uses printed waste paper in order to save raw material and to reuse waste products. In this procedure the pigments used for printing of the waste paper pass into the paper pulp, where they have an unfavorable influence on the quality, for they reduce the brightness and cause stains in the paper due to the fact that they dye relatively great particles thereof.

It was therefore necessary to remove these pigment portions from the waste paper pulp as far as possible by a flotation process. This removal may be carried out in the following manner: Alkalis, for example caustic soda, soda or sodium silicate are added to the repulped waste paper in order to detach the pigment particles from the fiber by attacking the binding agent. Thereupon the pigment particles are removed from the pulp by adding suitable chemicals, by way of a flotation process.

The chemicals added shall favor on the one hand the formation of air bubbles, which convey the pigment particles having a high specific weight upwards ("frothing agent"). On the other hand the chemicals shall favor the addition of the pigment particles to the air bubbles so that these particles may accumulate in the foam formed, which facilitates their removal from the process ("collector"). The particles acting as frothing agent moreover have a dispersing effect for the collector which is water-insoluble in most cases.

Hitherto fatty acids have been the most common substances in paper flotation. These acids form alkali metal soaps with the alkali originating from the pretreatment. Frequently alkali metal soaps are used as flotation agent, instead of the fatty acids. The alkali metal soaps react with the hardening constituents of the water partially to form calcium and magnesia soaps and the remaining portions act as frothing and dispersing agent, whilst the insoluble alkaline earth metal soaps act as collector.

This process easy by itself has, however, various disadvantages. For example, in a displacement of the pH into the acid range at a later stage, fatty acids are precipitated and pigment particles that have not been removed agglomerate thereon subsequently, which may lead to an undesired formation of stains (afterflotation). This free fatty acid may form deposits in the pipes and macerate resin particles that have been carried along, as a result of which the paper web frequently breaks. The effectiveness of the fatty acid used depends on the ratio of alkali metal soap to alkaline earth metal soap and therefor the foam formation and the collecting effect vary in dependence on the water hardness and the concentration of fatty acid. When adding too much alkali metal soap, the system becomes hydrophilic, as a result of which the foam formation is increased and the cellulosic fibers flotate, thus causing high losses of matter. When adding too much alkaline earth metal soaps, the system becomes hydrophobic, as a result of which a frothing agent is lacking and the collecting effect is poor and therefore the dirt particles are not removed in satisfactory manner. Very high losses of fibrous material may likewise result with extremely hydrophilic systems on the thickening agents. The activity of the soaps, consequently, depends on the hardness of the water.

Several trials have been made to replace the fatty acids or the alkali metal soaps thereof partially or completely by other substances. For example, the activity of the soap may be somewhat improved by adding sodium silicate. This, however, often causes difficulties in the waste water treatment and leads to the formation of deposits on the felts and drying cylinders which deposits are difficult to remove. W. Kolb (Wochenblatt für Papierfabrikation 4.77) recommends combinations of non-ionogenic surfactants (fatty alcohol ethoxylates). German patent DRP No. 235.3771 describes alkyllactams and alkyl pyrrolidones. In German patent DRP No. 214,3912 there is disclosed the use of ethylene oxide and propylene oxide adducts. In this case the hydrophobic properties required to reach a collecting effect are obtained by operating at temperatures above the cloud point of these adducts. All of the above products have the disadvantage that their manufacture, as compared with the soaps, is relatively expensive.

It has now been found that suitable carboxylic acid esters have a very good collecting effect. An excellent flotation effect can be obtained when adding to these esters an adequate relatively small quantity of surfactants acting as frothing and dispersing agent.

Subject of the present invention therefore is a flotation composition for removing pigments from waste paper, this composition consisting of an ester of the formula $$R(OCOR^1)_m \text{ or } R^4OOC—R^3—COOR^4$$

wherein m is 1, 2 or 3,

R in the case of m being 1 is $C_1$–$C_8$alkyl or a group of the formula $—(CH_2CH_2O)_n—R^2$ with n being an integer of from 1 to 10 and $R^2$ being $C_1$–$C_4$alkyl or hydrogen, R in the case of m being 2 is a group of the formulae

p is an integer of from 0 to 10,

R in the case of m being 3 is a group of the formula

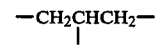

and $R^1$ is $C_{12}$–$C_{20}$-, preferably $C_{16}$–$C_{20}$-, alkyl or $C_{12}$–$C_{20}$alkenyl, preferably $C_{16}$–$C_{20}$alkenyl, $R^3$ is phenylene or $C_2$–$C_{10}$alkylene and $R^4$ is $C_1$–$C_8$alkyl, and of from 0 to 10, preferably 2 to 5, weight %, referred to an ester of the above formulae, of a surfactant.

The esters of the above formulae are fatty acid esters of mono- or polyhydric alcohols such as alkanols of medium chain length, ethylene glycol, polyethylene glycol, ether alcohols and glycerol or phthalic acid esters or alkanedicarboxylic acid esters. Fatty acid esters of monohydric alcohols having from 4 to 8 carbon atoms are preferred. The frothing agents used in the flotation composition are cationic, anionic or nonionic surfactants such as soaps, alkanesulfonates, alkylbenzenesulfonates, alkyl sulfates, sulfosuccinic acid esters or preferably oxethylated fatty acids and oxethylated alkyl phenols, optionally in the form of ether sulfates thereof. The quantity of these surfactants is in the range of from 1 to 10, preferably 2 to 5, weight %, referred to the carboxylic acid ester. The free carboxylic acid to be found very often in the esters may replace the surfactant partially or completely, with a view to its frothing and dispersing effect, in an alkaline medium, especially if this acid is a fatty acid. In this case, too, the quantity of precipitated acid, in the alkaline range, is so small that the above-described difficulties do not occur. When the alcohol component is a polyglycol of medium chain length, the surface-active activity of the latter is satisfactory so that the addition of an additional surfactant can likewise be dispensed with.

The feed quantity of the flotation composition described varies from about 2 to 6 kg per ton of waste paper and is hence smaller than half the quantity of soap hitherto used.

An advantage of the flotation composition according to the invention is that it needs be used in far smaller quantities than the soaps. Moreover the effectiveness of the flotation compositions according to the invention is independent on the pH of the water and on the hardness of the water. A further advantage is that there is no afterflotation, maceration of resin particles or precipitation in the neutral and acidic range. A still further advantage is that the dehydration velocity in the thickening process following flotation can be increased by the flotation compositions according to the invention without addition of dehydration agents.

The following examples illustrate the invention:

EXAMPLE 1

A mixture of 960 kg of tallow fatty acid isoamyl ester prepared according to any of the usual esterification processes and having an acid number of 5 and of 40 kg of nonylphenol ethoxylate having 6 ethylene oxide (EO) units is fed to the pulping device at a rate of from 3 to 4 kg per ton of waste paper at a concentration of matter of about 6%. The collecting effect is better than that reached with the hitherto used mixture of 13 kg of sodium soap and 30 kg of sodium metasilicate per ton of waste paper. The following flotation compositions were used in the same manner.

EXAMPLE 2

A mixture of 980 kg of oleic acid isooctyl ester having an acid number of 10 and of 20 kg of oleic acid polyglycol ester having an acid number of 10 and which has been prepared from polyethylene glycol having a molecular weight of 1,000 is used in this example.

EXAMPLE 3

The flotation composition used in this example is a mixture of 920 kg of dibutylphthalate and of 80 kg of a 50% aqueous alcoholic solution (1:1) of the sodium salt of sulfosuccinic acid isooctyl ester.

EXAMPLE 4

In this example the flotation composition consists of 960 kg of soybean oil and of 40 kg of sodium salt of sulfated nonylphenol ethoxylate having 6 EO units.

EXAMPLE 5

The flotation composition consists of 960 kg of dibutyladipate and 40 kg of sodium dodecylbenzenesulfonate.

EXAMPLE 6

The flotation composition used in this example is prepared in the following manner: One mol of ethylene glycol is esterified with one mol of soybean fatty acid until an acid number of 15 is reached at a temperature of from 180° to 200° C. with addition of 0.1% of p-toluenesulfonic acid and by passing an inert gas through. The product is used without addition of a surfactant.

EXAMPLE 7

150 kg of triethylene glycol are esterified with 570 kg of refined colza oil until an acid number of 10 is reached, at a temperature of 160° C. with addition of 0.1% of concentrated sulfuric acid and with the use of toluene, in a recycle process, the toluene being separated by distillation in vacuo upon completion of the reaction. At the end of the reaction there are added 40 kg of triisobutylphenol ethoxylate having 6 EO units.

EXAMPLE 8

400 kg of polyethylene glycol of a molecular weight of 400 are heated in vacuo to 180° to 190° C. with 570 kg of oleic acid with addition of 0.2% of p-toluenesulfonic acid, until the acid number was dropped below 8. The ester obtained is used as flotation agent without further addition of a surfactant.

What is claimed is:

1. A process for removing pigment from waste paper pulp containing waste paper pulp fiber, which process comprises the steps of:
   detaching pigment particles from the fiber in the waste paper pulp;
   adding to the waste paper pulp a flotation composition comprising an ester of the formula
   $R(OCOR^1)_m$ or $R^4OOC-R^3-COOR^4$
   wherein
   m is 1, 2 or 3,
   R in the case of m being 1 is $C_1-C_8$alkyl or a group of the formula $-(CH_2CH_2O)_n-R^2$ with n being an integer of from 1 to 10 and $R^2$ being $C_1-C_4$alkyl or hydrogen,
   R in the case of m being 2 is a group of the formulae

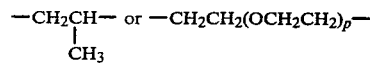

P is an integer of from 0 to 10,
R in the case of m being 3 is a group of the formula

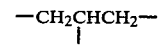

and $R^1$ is $C_{12}-C_{20}$alkyl or $C_{12}-C_{20}$alkenyl, $R^3$ is phenylene or $C_2-C_{10}$alkylene and
$R^4$ is $C_1-C_8$alkyl,
and of from 0 to 10 weight %, referred to an ester of the above formulae, of a surfactant;
collecting the pigment particles by froth flotation effected with the aid of the collecting and frothing and dispersing effects provided by said flotation composition, thereby separating the pigment particles from the waste paper pulp.

2. A process according to claim 1 wherein said flotation composition contains from 2 to 5 weight % of the surfactant, based on the weight of the ester.

3. A process according to claim 1 wherein said surfactant comprises oxyethylated fatty acid or oxyethylated alkyl phenol.

4. A process according to claim 2 wherein said surfactant comprises oxyethylated fatty acid or oxyethylated alkyl phenol.

5. A process according to claim 1 wherein the said flotation composition contains an amount of the surfactant, less than said 10 weight %, but sufficient for the surfactant to be effective as a frothing and dispersing agent.

* * * * *